Patented June 12, 1928.

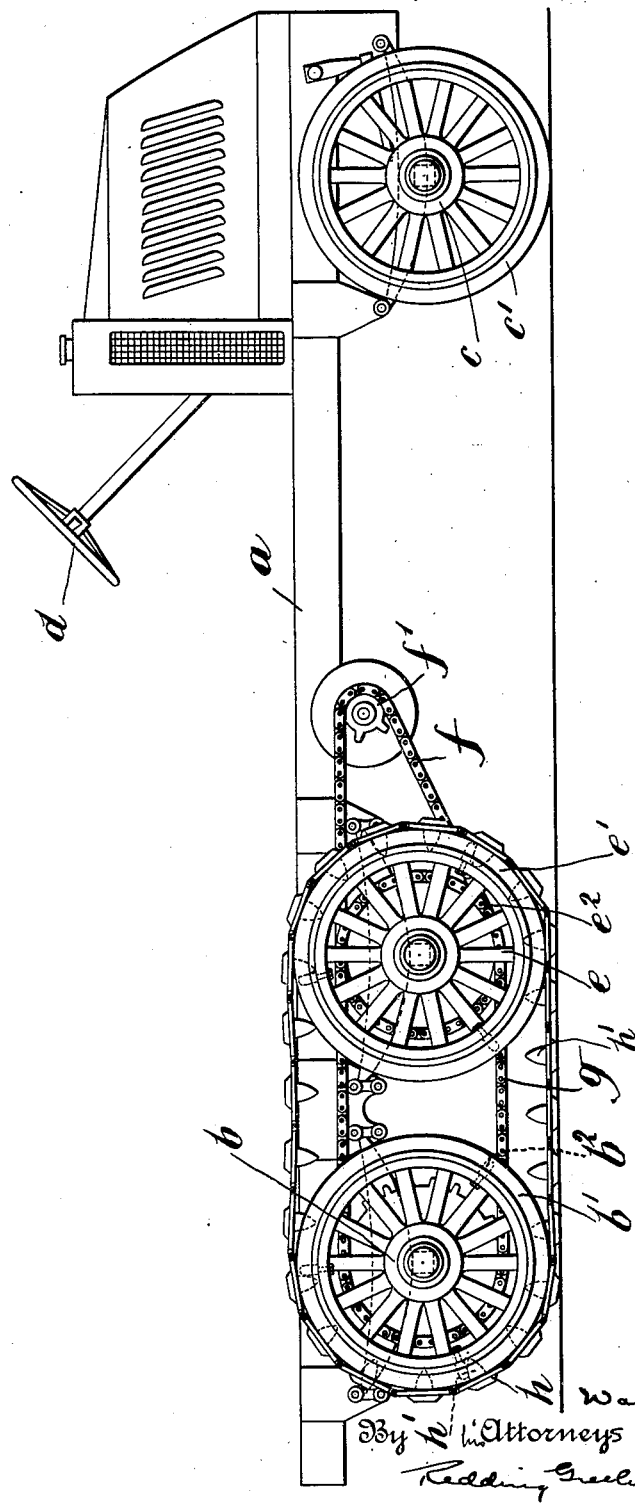

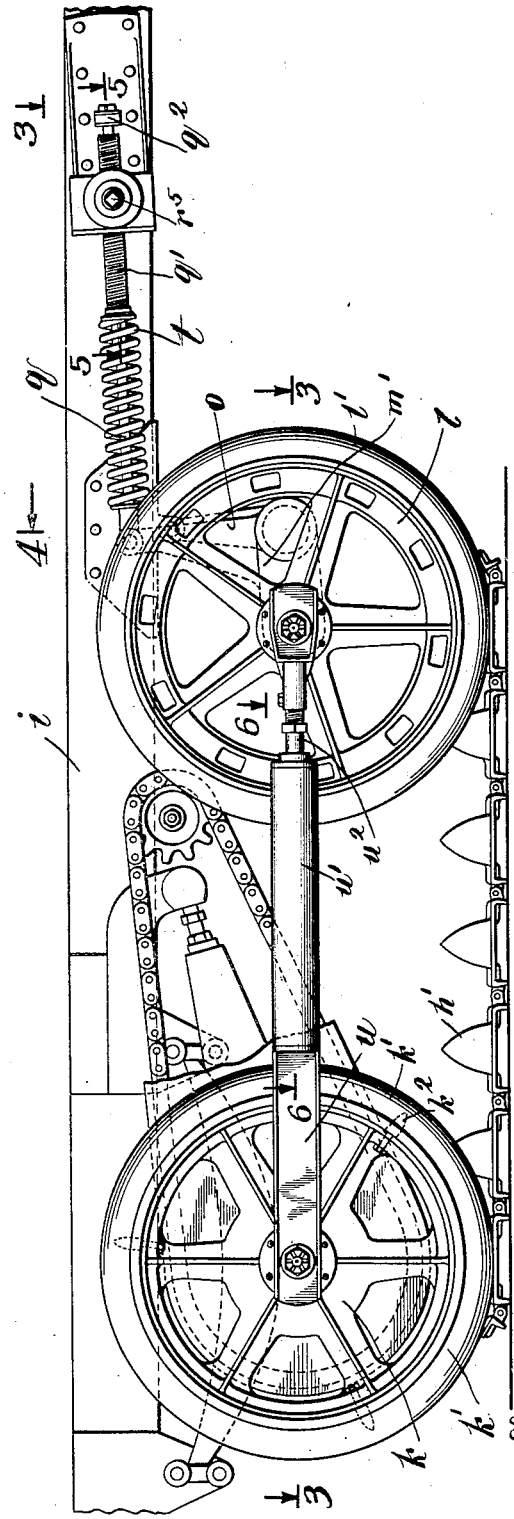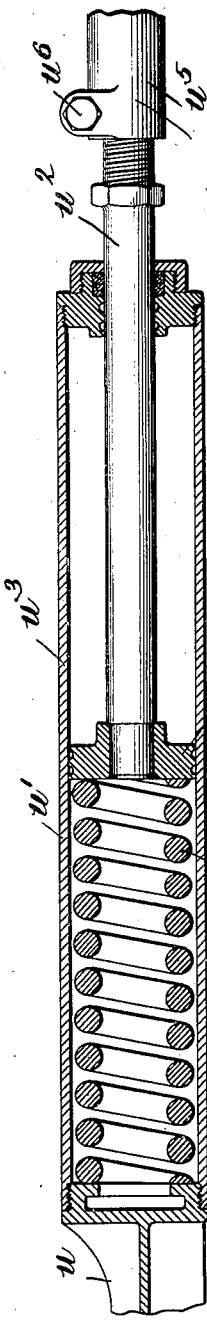

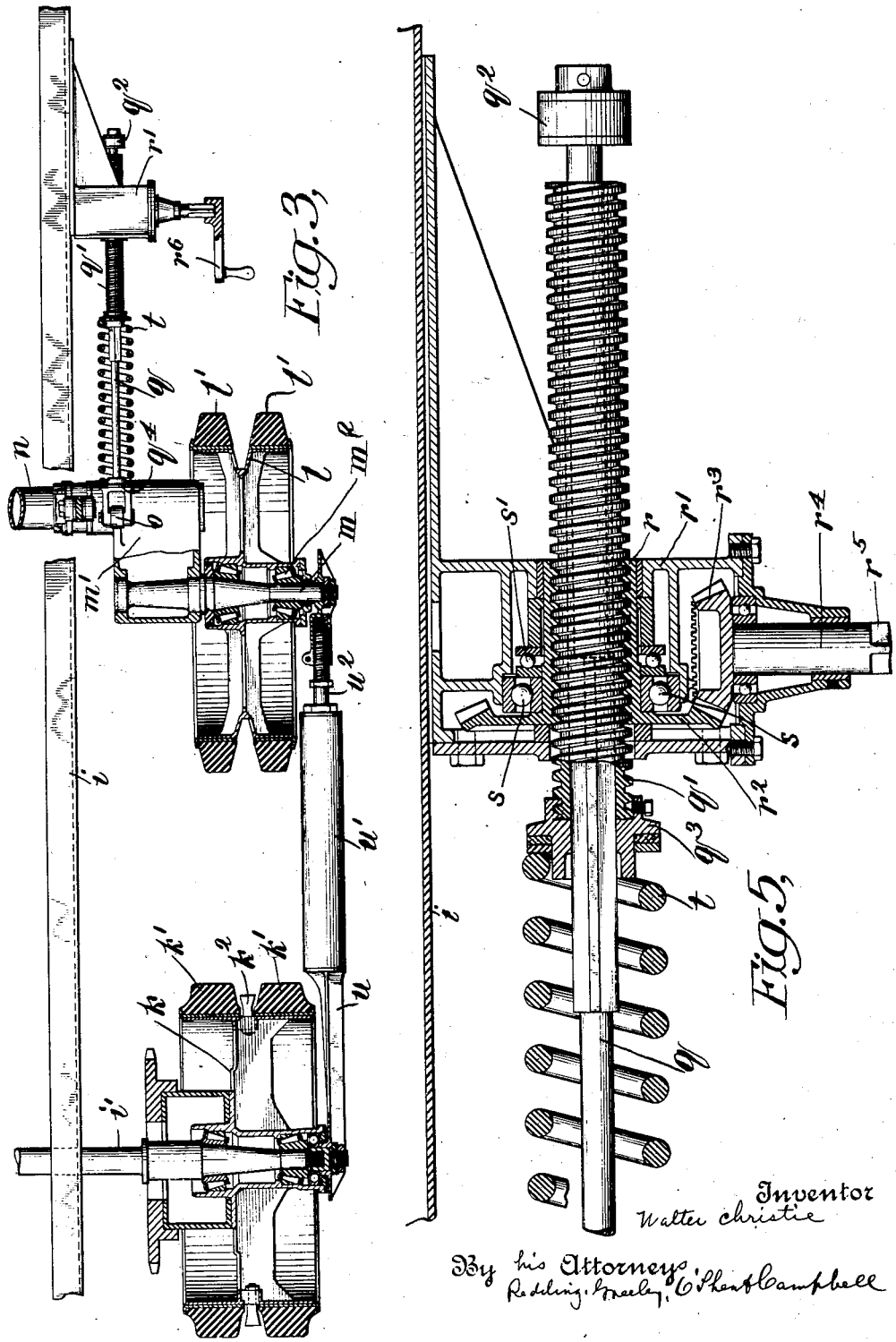

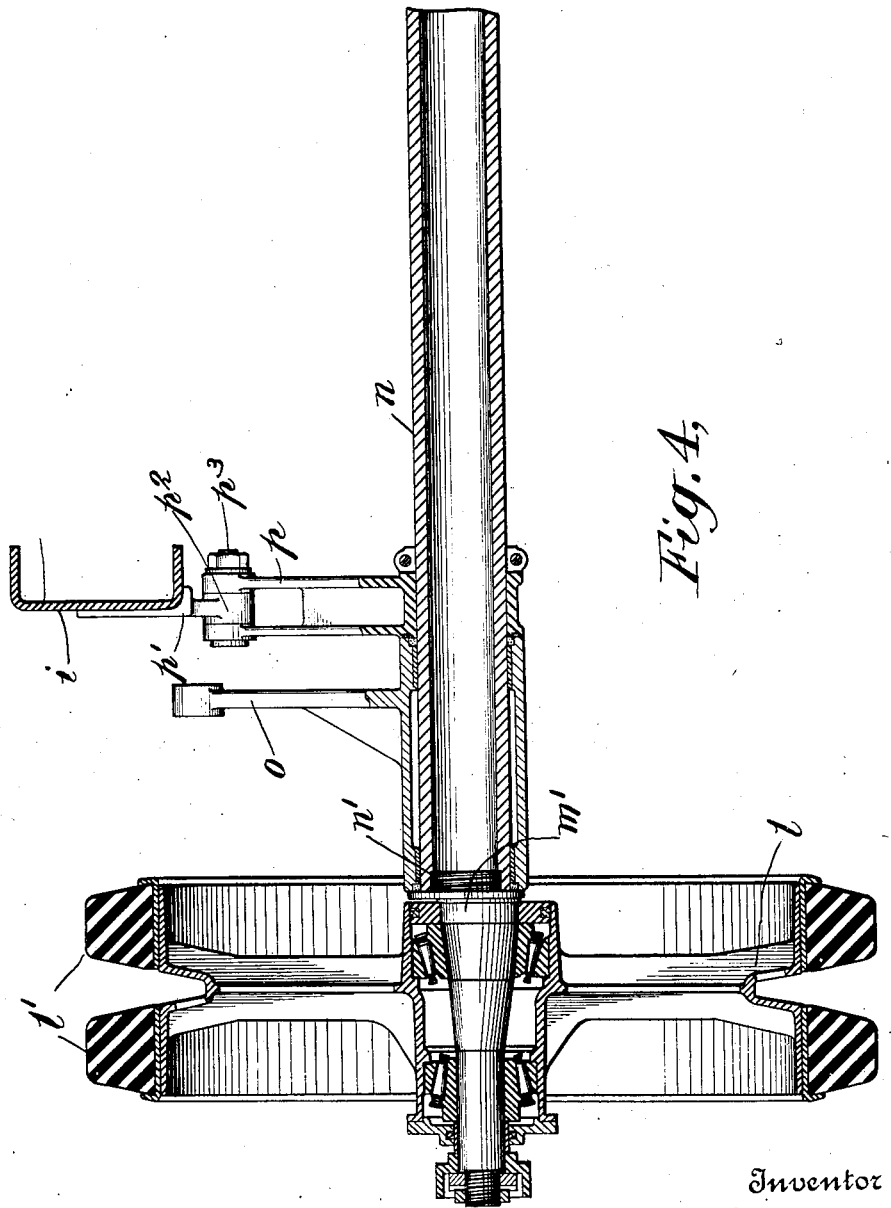

1,673,102

UNITED STATES PATENT OFFICE.

WALTER CHRISTIE, OF AVON, NEW JERSEY, ASSIGNOR TO CHARLES R. LORD AND CLAYTON FARRIS, OF NEWARK, NEW JERSEY.

CONVERTIBLE WHEELED TRUCK TRACTOR.

Application filed January 26, 1924. Serial No. 688,638.

Motor trucks as a means of transportation are rapidly increasing in favor but their limitations under difficult conditions of terrene are very definite. Track laying tractors, on the other hand, meet these difficult conditions of terrene but lack the mobility and speed adapting them for the more general purposes for which motor trucks are employed. Expedients have been proposed to increase the field of usefulness of motor trucks by providing for additional traction through so called "adapters" and by the use of chains applied directly to the treads of the wheels. However, so far as is known, none of these devices have ever proven to be more than make-shifts and none of them have provided for the conversion of a rubber-tired road vehicle into essentially a track laying tractor by applying tracks around a plurality of rubber-tired wheels at opposite sides of the vehicle, leaving the usual steering wheels free for angular movements and utilizing the traction wheels for the truck as propelling wheels for the track. The present invention is concerned with a commercially practicable road vehicle having resilient treads on the wheels and adapted to be steered as a road vehicle by conventional front steering wheels, but including one or more additional wheels at each side provided with resilient treads over which may be passed a track laying track of conventional form, this track passing likewise around the resilient treads of the traction wheels and being engaged operatively thereby for propulsion.

A further object of the invention is to provide such a vehicle with additional road wheels having resilient treads which are so mounted with respect to the frame as to be sprung and move freely for compensation in irregularities in the terrene so as to follow such irregularities and afford the maximum support to the vehicle at all times whether or not the tracks are applied.

More particularly, the invention is concerned with an embodiment of the principles enumerated herein in which one pair of additional wheels having resilient treads is associated with the usual driving wheels of a truck and mounted independently on crank arms which are subject constantly to spring action for the purpose of permitting such additional wheels to move yieldingly when following the terrene. A further object of the invention is to so articulate the additional wheels, respectively, with the axle member on which the driving wheels are journaled as to keep the respective tracks tight at all times and provide for independent oscillation of the additional wheels about their axes and in such manner as not to result in any decrease in centers and resulting slackness in the tracks.

A further object of the invention is to provide a mounting for such additional wheels which is inexpensive and quickly applied to a motor truck of conventional design and disconnected therefrom, if desired, and to provide additional road wheels which may be supported at a distance from the road surface, if desired, without disturbing the parts.

These and other objects of the invention will appear with greater particularity hereinafter in connection with the following description which is given with reference to two suitable embodiments of the broad principles of the invention.

In the drawings:

Figure 1 is a view in side elevation of an improved convertible truck tractor embodying the invention and illustrating somewhat conventionally suitable arrangements of elements for converting a conventional truck into a tractor by the improved system.

Figure 2 is a view of a modified embodiment in which the additional wheels, while spring pressed, are maintained at a fixed distance from the driving wheels and are susceptible of movement about an eccentric axis.

Figure 3 is a fragmentary view partly in plan and partly in horizontal section showing the relation of parts illustrated in Figure 2.

Figure 4 is a fragmentary detailed view in transverse section showing the mounting on a separate shaft section of the intermediate wheels shown in Figures 2 and 3.

Figure 5 is a detailed view partly in horizontal section and partly in plan showing the adjustable spring means associated with the intermediate wheels.

Figure 6 is a detailed view in section of suitable cushioning elements interposed in the distance rod for relieving the parts of undue shocks.

Before describing the preferred embodiment of the invention illustrated in Figures 2–6, a general description which will emphasize the broader aspects of the invention will be given with reference to the construction illustrated in Figure 1. This phase of the invention is concerned with the provision of a commercially practicable convertible wheeled truck which may run on the road on resilient treads and be steered in the conventional way through angularly swinging steering wheels and yet have its tractive effort increased by application to certain of the road wheels of removable track laying tracks. As shown in Figure 1 the chassis frame $a$ of a motor truck is supported in any suitable manner on load wheels $b$ and steering wheels $c$ which may be swung angularly in the conventional manner through a steering wheel $d$, these wheels being provided with suitable resilient treads indicated, respectively, at $b'$, $c'$. Between the load wheels $b$ and the steering wheels $c$ are disposed at opposite sides of the chassis frame $a$, intermediate wheels $e$ which also have resilient treads $e'$ and are adapted to run on the road and sustain a portion of the load. The invention is not to be limited to the particular drive employed but for purposes of completeness there is indicated a driving chain $f$ engaging a driving sprocket $f'$ and a sprocket $e^2$ on the wheel $e$. In order that both wheels $b$, $e$, may be positively driven they may be interconnected operatively as by another chain $g$ engaging sprockets (not illustrated) on the respective wheels. Operation of the vehicle on the road as a truck will be accomplished in the usual manner through the parts described. By the present invention, however, it is proposed to convert the truck into a track laying tractor, when required, to increase its traction and assist in the negotiation of rough terrene. Accordingly, the resilient treads $b'$, $e'$, are preferably of a dual nature so that a suitable metal track $h$ may be passed over and around the wheels $b$, $e$, and the lugs $h'$ of each link be received in the circumferential channel between such dual tires. The track $h$ is of a strong and durable nature and it may be applied around the wheels quickly or removed therefrom whenever the vehicle is to be reconverted for truck service. Driving lugs indicated at $b^2$ may be secured to the wheel $b$ in the channel between the dual tires and engage the lugs $h'$ of the links of the track $h$ for propulsion thereof when the tracks are in place.

The characteristic features of the invention as described in the aforegoing embodiment are carried into the embodiment illustrated in Figures 2–6 and it is believed that this embodiment may possess certain advantages. As shown, the chassis frame $i$ of a truck is supported adjacent its rear end on driving wheels $k$ which have resilient treads $k'$ formed as dual tires as shown in Figure 3. The usual front steering wheels (not illustrated) of the same character as those described in connection with Figure 1 are provided at the front end of the chassis. Intermediate wheels $l$ are connected to the chassis frame at a point in front of the driving wheels $k$ and said intermediate wheels also having resilient treads $l'$ of a dual character as shown in Figure 3. Since the construction at opposite sides of the chassis frame is similar, a description of the parts at one side thereof only is sufficient. The intermediate wheel $l$ is journaled on a short shaft $m$ carried by a crank arm $m'$, through suitable bearings $m^2$ this wheel being adapted to revolve on the shaft $m$ and move about the axis of the arm $m'$ as will appear later. The wheel $l$ is aligned with the drive wheel $k$ so that a removable track of the character described with reference to Figure 1 may be passed over and around the yielding treads $k'$, $l'$, and the lugs guided between the channels separating the dual tires. The means for journaling the oscillating arm $m'$ are best shown in Figure 4. Extending transversely of the chassis frame $i$ is a tube $n$ on the opposite ends of which are journaled loosely the arms $m'$ of the intermediate wheels $l$. On the arm $m'$ is fixed a vertically extending arm $o$. The support for the tube $n$ is afforded through depending links $p$ which are journaled at their upper ends on a bracket $p'$ bolted to the chassis frame $i$ and carrying a supporting sleeve $p^2$ through which passes a connecting pin $p^3$ for the links.

To the upper end of the arm $o$ is pivotally connected a plunger rod $q$ which passes through a threaded sleeve $q'$ engaged with a stationary nut $r$ carried by a bracket $r'$ bolted or otherwise secured to the side frame member $i$. The nut $r$ carries on its hub a gear $r^2$ with which engages operatively a pinion $r^3$ carried with a stub shaft $r^4$ which is also journaled in the bracket $r'$ and squared as at $r^5$ for engagement with a suitable operating member such as a crank handle $r^6$ as shown in Figure 3. A journal bearing $s$ and thrust bearing $s'$ are associated with the nut $r$ in such manner as to support the same for free rotation while resisting axial thrust. In the outer end of the plunger rod $q$ is carried an abutment $q^2$ which may be engaged in certain positions of the sleeve $q'$ by the end thereof to cushion longitudinal movement of the plunger $q$ and through it oscillation of the arm $m'$ in a clockwise direction about the tube $n$. At the inner end of the sleeve $q$ is secured a circular plate $q^3$ on which seats a spring $t$ interposed operatively between it and a circular plate $q^4$ on the inner end of the plunger rod $q$. The action of the spring $t$ normally is to press the arm $m'$ yieldingly in a counter-clockwise direction about the tube $n$ so as to force the wheel $l$ downwardly towards the ground. The tension of the spring $t$ may be adjusted by movement of the sleeve $q'$ under the influence of the nut $r$ in the manner described. It is through this spring that the wheel $l$ absorbs yieldingly part of the load of the vehicle whether or not the track is on or off, except when the wheel is actually elevated from the ground positively by engagement of the sleeve $q'$ with the abutment $q^2$ on the plunger rod $q$ and oscillation of the arm $m'$ on the tube $n$ in a clockwise direction to an extent sufficient to raise the wheel.

Since the wheel $l$ is mounted to swing on an arc about the axis of the supporting tube $n$ and eccentrically to the axis of movement of the shaft it is important that its yielding movements shall not decrease the centers between it and the drive wheel $k$ and thus permit slack in the track. The distance from the center of the shaft $m$ to the center of the wheel $k$ is kept substantially constant by means of the distance rod indicated generally at $u$ which is preferably formed in two sections $u'$, $u^2$. The section $u'$ is pivotally engaged with the axle $i'$ which supports the wheel $k$ while the other section $u^2$ is connected to the shaft $m$ which supports the wheel $l$. These two sections are yieldingly interconnected through a spring $v$ disposed within a cylinder $u^3$ constituting a part of the section $u'$. In this case the section $u^2$ extends into the cylinder $u^3$ and carries at its end a plunger $u^4$ on which one end of the spring $v$ seats. The section $u^2$ may be adjusted in length by a turnbuckle connection $u^5$ to the end that the center distances may be initially determined and the spring tension $v$ set accordingly.

It is to be remembered that the supporting tube $n$ is suspended pivotally through the links $p$ from the side frame member $i$ and so is capable of swinging movement. When the intermediate wheel $l$ oscillates on the crank arm the distance rod $u$ holds its center fixed with respect to the center of the drive wheel $k$ although the arm $m'$ with the tube $n$ may thereby be swung slightly. By this construction it is evident that although the wheel $l$ is subject at all times when in use to the pressure of the spring $t$ which forces it yieldingly downward it may move upwardly over irregularities in the ground against the action of the spring without loosening the track.

In assembling the intermediate wheel and its mounting, it is evident that the link $p$ will first be slipped onto the tube $n$, the bearing sleeve of the arm $n$ will then be slipped onto the tube and the retaining cap $n'$ then threaded into the end of the tube. The wheel at the other side of the chassis may be assembled with its shaft on the tube $n$ in a similar manner and the entire assembly then put under the truck until the links $p$ are secured to the bracket $p'$ through the pin $p^3$ and bearing bushing $p^2$. The plunger rod $q$ with its spring $t$ is then assembled in a horizontal position and the desired spring tension brought on the arm $o$ through the threaded sleeve $q'$ as heretofore explained. The distance rod composed of the sections $u'$, $u^2$, is then assembled and the section $u^2$ threaded in against the spring $v$ until the desired distance between centers is secured, the spring $v$ meanwhile being placed under compression. A set screw $u^6$ serves to lock the parts in adjusted relation. The vehicle may be operated as a truck with the rubber-tired wheel $l$ in engagement with the ground or, if desired, this wheel may be elevated through the plunger rod $q$ as described. When the track is passed around the wheels $k$, $l$, however, the sleeve $q'$ will always be turned so as to bring the spring $t$ into action and press the wheel $l$ downwardly so as to absorb its proportion of the load and keep the track tight. Lugs $k^2$ in the channel between the dual tires $k'$ of the drive wheel will engage coacting lugs on the inner face of each link for propulsion of the track in the manner described with reference to the embodiment shown in Figure 1. When operating as a tractor full compensation for irregularities in the terrene is afforded, the steel track runs over rubber or other non-metallic yielding material, independent action of the tracks at opposite sides of the frame is permitted, all of the parts are fully sprung, centers are preserved so that the track is kept tight and the load is evenly absorbed so as to reduce the unit ground pressure to a minimum. The entire construction is light, simple and inexpensive and readily assembled and disassembled and affords provision for conventional tractor type of vehicle which is convertible quickly into a truck construction of conventional form.

Changes in details of construction and design may be made without departing from the spirit of the broad invention illustrated by the two embodiments shown in the drawings.

What I claim is:

1. In a convertible wheeled truck tractor additional load wheels having resilient treads disposed at opposite sides of the vehicle, bell crank arms on which said wheels are pivoted independently, means to support the bell crank arms pivotally on the frame of the vehicle and spring means operatively connected to the bell cranks to press the wheels independently towards the terrene.

2. In a convertible wheeled truck tractor in combination with the drive wheels thereof additional rubber-tired wheels, said wheels and the drive wheels, being adapted to receive track laying tracks around their treads, separate arms on which said extra wheels are journaled, means to suspend the arms pivotally from the frame of the vehicle, additional crank arms carried with the said arms, horizontally disposed springs operatively engaged with said last named arms to force the respective wheels yieldingly towards the terrene, means for adjusting the tension of said springs, and means interconnecting operatively the driving wheels and said additional wheels to maintain their centers at a fixed distance.

3. In a convertible wheeled truck tractor in combination with the drive wheels thereof additional rubber-tired wheels, said wheels and the drive wheels, being adapted to receive track laying tracks around their treads, separate arms on which said extra wheels are journaled, means to suspend the arms pivotally from the frame of the vehicle, additional crank arms carried with said arms, horizontally disposed springs operatively engaged with said last named arms to force the respective wheels yieldingly towards the terrene, means for adjusting the tension of said springs, and means interconnecting operatively the driving wheels and said additional wheels to maintain their centers at a fixed distance, said means including a two part distance rod and a cushioning element interposed operatively between the parts of said distance rod.

4. In a convertible wheeled truck tractor having steering wheels, in combination, a load wheel on each side of the vehicle, an additional load wheel between the steering wheel and load wheel on each side of the vehicle, means to give the axis of the additional wheel an arcuate movement about another axis, means to give said second named axis an arcuate movement, and an endless track adapted to pass about the load wheels.

This specification signed this 28th day of August, A. D. 1923.

WALTER CHRISTIE.